United States Patent Office 3,657,280
Patented Apr. 18, 1972

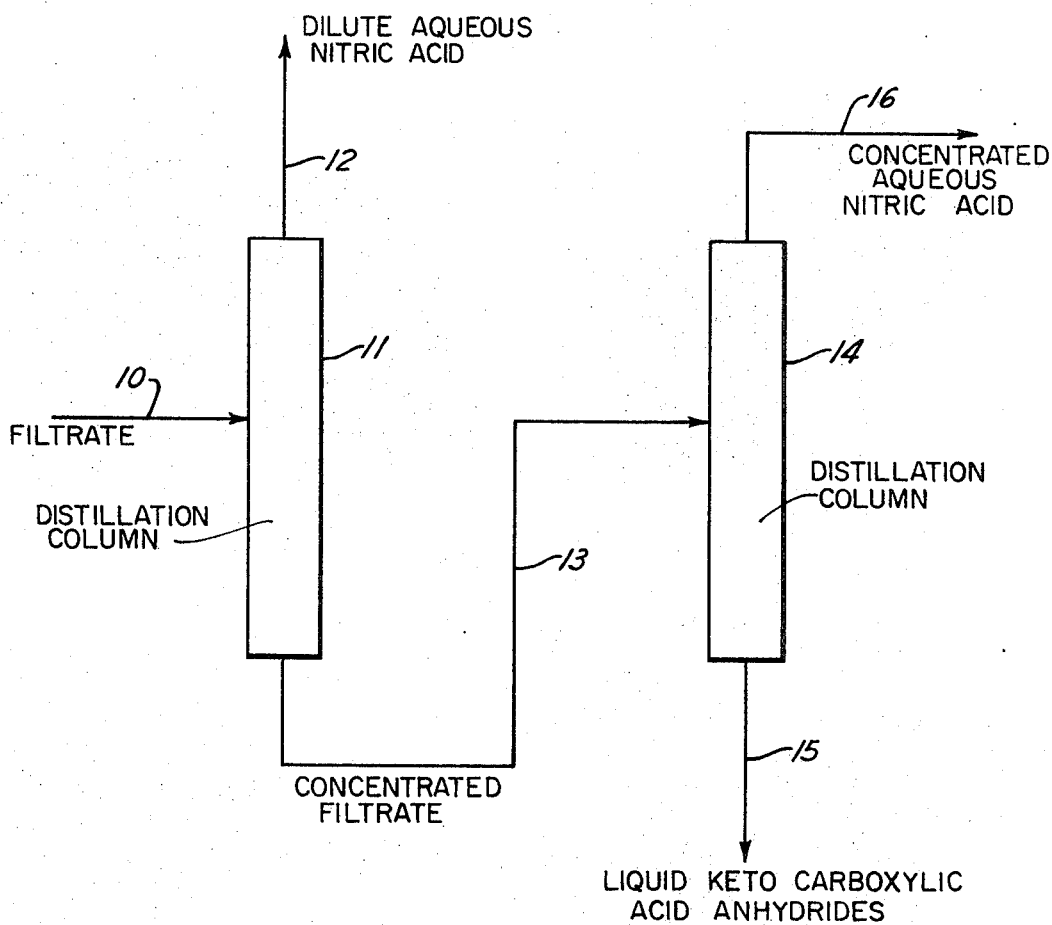

3,657,280
PROCESS FOR PRODUCING A KETO POLY-
CARBOXYLIC ANHYDRIDE AND RECOVERY
THEREOF BY PLURAL STAGE DISTILLATION
Henri K. Lese, Monroeville, and Rex W. Smyth, Gibsonia,
Pa., assignors to Gulf Research & Development Company, Pittsburgh, Pa.
Filed May 8, 1970, Ser. No. 35,680
Int. Cl. B01d 3/14; C07c 61/36
U.S. Cl. 260—346.4                                 2 Claims

ABSTRACT OF THE DISCLOSURE

A filtrate obtained from the nitric acid oxidation of 1,1 - bis(3,4 - dialkylphenyl)alkanes and containing nitric acid, water and keto polycarboxylic acids is separated into at least three fractions, the first consisting essentially of an aqueous solution containing up to about 10 percent by weight of nitric acid, the second consisting essentially of an aqueous solution containing from about 20 to about 65 percent by weight of nitric acid, and the third containing liquid keto polycarboxylic acids in dehydrated form.

This invention relates to an improved process for preparing keto polycarboxylic anhydrides and, more particularly, to a process for preparing such anhydrides in liquid form.

The anhydrides produced in accordance with the present invention are easily incorporated into epoxy resins, such as Epon 828, an epoxy resin manufactured by Shell Chemical Company, New York, New York, and are useful as curing agents therefor to produce resins having high heat distortion temperatures and Barcol hardness.

In the past, as illustrated, for example, in U.S. Pat. 3,466,301 to McCracken et al., keto polycarboxylic acids and their corresponding anhydrides were prepared by the nitric acid oxidation of 1,1-bis(3,4-dialkylphenyl) alkanes having from one to five, preferably from one to three, carbon atoms in the alkyl substituent and from two to five, preferably from two to three, carbon atoms in the alkane portion thereof. Examples of compounds that could be employed as the charge to the oxidation reactor include 1,1-bis(3,4-dimethylphenyl)ethane, 1,1-bis(3,4-dipropylphenyl)ethane, 1,1-bis(3,4-diamylphenyl)propane, 1,1-bis(3-methyl,4-butylphenyl)pentane, 1-(3-ethyl,4-propylphenyl), 1-(3-methyl,4-ethylphenyl)ethane, etc., with 1,1-bis(3,4-dimethylphenyl)ethane being preferred.

Generally speaking, the first step in the McCracken et al. oxidative process involved contacting the charge identified above with nitric acid having a concentration of about 5 percent to about 70 percent by weight. The amount of nitric acid employed, determined as the molar ratio of 100 percent nitric acid relative to the charge, was about 8.0 to about 17.0, preferably from about 8.0 to about 12. The residence time required for the oxidation was from about one minute to about 48 hours, preferably from about 10 minutes to about 2 hours. Temperatures of about 100° to about 350° C., preferably about 150° to abount 250° C., and pressures sufficient to maintain the reaction system primarily in the liquid phase, e.g., from about atmospheric to about 500 pounds per square inch gauge or higher, were employed.

Upon completion of the oxidation reaction, the reaction product was permitted to cool down, preferable to room temperature, until a solid precipitate was formed. This may have required, for example, from about one to about 24 hours. The resulting crystals were separated from the mother liquor by any convenient method, for example, by filtration. Regardless of the charge employed, the crystals so obtained were benzophenone 3,4,3',4'-tetracarboxylic acid because under the conditions described, the alkyl substituents on the ring, regardless of their length, were converted to carboxylic acid groups and the alkane portion or bridge of the charge, regardless of its length, was converted to a bridge carbonyl.

The filtrate remaining after the benzophenone 3,4,3',4'-tetracarboxylic acid crystals had been removed therefrom contained the keto polycarboxylic acids from which the keto polycarboxylic anhydrides of the present invention are derived. These keto polycarboxylic acids are now believed to possess the following approximate composition in percent by weight: 30 to 35 percent trimellitic acid; 20 to 25 percent phthalic acid; three to six percent 3-nitrophthalic acid plus 4-nitrophthalic acid; three to six percent salicylic acid plus 5-nitrosalicylic acid; five percent 2,4,6-trinitrophenol; five to 10 percent acetic acid; five to 10 percent ammonium nitrate; and a remaining fraction containing an indeterminate number of unidentified compounds in low concentration. As described in the McCracken et al. patent, the keto polycarboxylic anhydrides corresponding to the product keto polycarboxylic acids could be recovered as a solid by evaporation and heating of the above-described filtrate. As a result of this, nitric acid, water, nitrogen oxides and other volatile materials were driven off and a solid keto polycarboxylic anhydride product remained.

It has now been found that the desired keto polycarboxylic anhydrides can be recovered in liquid form, which is more easily handled than the previously obtained solid form, by separating a filtrate identical in nature to that described in the McCracken et al. patent into at least three distinct liquid fractions, the first fraction comprising a dilute stream containing mostly water and up to about 10 percent, preferably 2 to 5 percent, nitric acid, the second fraction comprising an aqueous solution containing between about 20 and about 65 percent nitric acid, and a third fraction comprising a liquid or syrup containing the desired keto polycarboxylic anhydride in liquid form.

It has been unexpectedly found that the separation may be best accomplished, in a preferred embodiment, by continuously feeding the above-defined filtrate into a first distillation column operating in a temperature range of about 90° to about 340° F., preferably about 212° to about 220° F., and a pressure of about one to about 100 pounds per square inch absolute, preferably about atmospheric pressure, to remove the above-defined first fraction as overhead and a concentrated filtrate as bottoms. The concentrated filtrate is then continuously fed to a second column where it is distilled at a temperature in the range of about 270° to about 390° F., preferably between about 270° and 330° F., and at a pressure of about 45 to about 100 pounds per square inch absolute, preferably about 45 to about 55 pounds per square inch absolute, to drive off the second or concentrated nitric acid fraction as overhead. The bottoms of the second column comprises the dehydrated keto polycarboxylic anhydride in liquid form. The utilization of high temperatures and high pressures in the last stages of distillation serves a particularly important function herein, for under these conditions keto polycarboxylic acids are prevented from precipitating out of solution and column plugging is avoided. In addition, by recovering two aqueous nitric acid fractions, as defined above, greater economies are obtained in the nitric acid oxidation of 1,1-bis(3,4-dialkylphenyl)alkanes. Although the first aqueous nitric acid fraction could be reused in the oxidation of the defined diaryl alkanes, its utility is not great. The second aqueous nitric acid fraction, containing from about 20 to 65 percent nitric acid, is particularly desirable in the defined oxidation, since we have found that nitric acid of such concentration produces excellent yields of the 3,4,3',4'-tetracarboxylic acid in a reasonable length of time. The invention can be further illustrated by the following, wherein the term "percent" refers to percent by weight unless specified otherwise.

EXAMPLE I

In a one gallon stainless steel autoclave was charged 448 grams of di-ortho-xylylethane and 820 grams of water. The mixture was agitated and heated to 275° F. Over a period of 4 hours, 2,408 grams of 67 percent aqueous nitric acid were pumped into the agitated mixture. For the first 1.5 hours of addition, the temperature was maintained at 275° F., over a period of one hour the temperature was raised to 350° F., and then the temperature was held at 350° F. until one hour after nitric acid addition was complete. Pressure during the reaction was maintained at 200 p.s.i.g. The product was then removed from the reactor, cooled, and allowed to stand for 4 hours after reaching room temperature. Solid crystals of benzophenone 3,4,3',4'-tetracarboxylic acid in an amount of 454 grams were recovered by filtration. The residual filtrate weighed 1785 grams.

EXAMPLE II

A filtrate, as defined herein, was prepared according to the conditions of Example I, except that a 500 gallon reactor was used and the charge and feed streams were 500 times larger. A portion of this filtrate was evaporated batch-wise at substantially atmospheric pressure and at a temperature of about 212° to about 220° F. until approximately one-half of its volume remained. The remaining concentrated filtrate, containing 20.7 percent by weight of nitric acid, 11.8 percent keto polycarboxylic acid and 67.5 percent water, was preheated to 285° F. and pumped at the rate of 408 cc. per hour (459 grams per hour) into a one inch inner diameter continuous distillation column comprising 20 plates above and 20 plates below the feed plate. A sight glass was installed between the reboiler and the column bottom to serve as a foam disengaging space and for visual observation. The column was maintained at 35 p.s.i.g. so that a reboiler temperature of about 300° F. would be maintained, to prevent solids precipitation. The overhead temperature was about 280° F. at a reflux ratio of one to one. The heat input to the reboiler was kept high enough to drive nitric acid and water overhead, but was kept low enough to prevent excessively high temperatures in the reboiler. The overhead, containing 23.4 percent nitric acid and 76.6 percent water, was obtained at a rate of 404 grams per hour. The molten bottoms contained 98.8 percent keto carboxylic anhydrides, 0.8 nitric acid and 0.4 percent water. The acid contents of all streams were determined by potentiometric titration.

EXAMPLE III

A combined filtrate prepared in accordance with Example I was distilled at a temperature in the range of about 212° to 220° F. and at substantially atmospheric pressure in a 1 inch inner diameter continuous distillation column comprising 15 plates above and 15 plates below the feed plate. As the distillation continued and the bottoms became more and more concentrated, the plates beneath the feed plate began to plug up. Even after installing a disengaging section between the bottom plate and the still-pot, plugging up continued to occur.

In view of the foregoing examples, it is apparent that the process of the present invention, as illustrated in Example II, exhibits advantages which are not attainable with the single column continuous distillation procedure illustrated in Example III.

The accompanying figure illustrates a distillation system of the type employed in performing the above-described separation. In a preferred embodiment, the filtrate, such as that defined in the McCracken et al. patent referred to above, is charged through line 10 to column 11. The filtrate is then split into an overhead fraction containing dilute aqueous nitric acid and a bottoms fraction containing concentrated filtrate. The overhead fraction is removed from column 11 through line 12 while the concentrated filtrate is continuously fed through line 13 to a second column 14. The concentrated filtrate is then split into an overhead stream containing concentrated aqueous nitric acid and a bottoms stream comprising molten, dehydrated keto polycarboxylic anhydrides. The resulting bottoms is removed from the column 14 via line 15 while the overhead stream of concentrated nitric acid is recycled to the oxidation reactor (not shown) via line 16. The conditions defined above are maintained in the distillation columns.

While we have described above the use of two columns to obtain the defined three streams, it is within the purview of the procedure defined and claimed herein to obtain the desired separation in one column. For example, the dilute aqueous nitric acid stream can be removed overhead from a single column, the concentrated aqueous nitric acid stream can be removed as a side stream from said column and the keto polycarboxylic anhydrides can be recovered from the base thereof in liquid form. Thus, the dilute aqueous nitric acid stream can be recovered under conditions including a temperature of about 270° to about 340° F., preferably about 270° to about 290° F., and a pressure of about 45 to about 100 pounds per square inch absolute, preferably about 45 to about 55 pounds per square inch absolute. To recover the concentrated aqueous nitric acid srteam, a temperature of about 270° to about 390° F., preferably about 270° to about 330° F., and a pressure of about 45 to about 100 pounds per square inch absolute, preferably about 45 to about 55 pounds per square inch absolute, can be used.

Obviously, many modifications and variations of the invention, as hereinabove set forth, can be made without departing from the spirit and scope thereof, and therefore, only such limitations should be imposed as are indicated in the appended claims.

We claim:

1. In a process wherein a 1,1-bis(3,4-dialkylphenyl)-alkane having from 1 to 5 carbon atoms in the alkyl substituent and from 2 to 5 carbon atoms in the alkane portion thereof is oxidized with an aqueous solution of nitric acid at an elevated temperature and pressure to obtain a solution containing benzophenone 3,4,3',4'-tetracarboxylic acid, water, nitric acid and a product ketocarboxylic acid, wherein said solution is cooled to precipitate benzophenone 3,4,3',4'-tetracarboxylic acid crystals therefrom, wherein said crystals are separated from the resulting filtrate, and wherein liquid ketocarboxylic acid anhydrides are recovered from said filtrate, the improvement which comprises continuously feeding said filtrate into a first distillation column operating in a temperature range of about 90° to about 340° F. and a pressure of about one to about 100 pounds per square inch absolute to remove a first fraction overhead comprising a dilute stream containing water and up to about 10 percent nitric acid and a concentrated filtrate as bottoms, feeding said concentrated filtrate to a second column operating in the range of about 270° to about 390° F. and a pressure of about 45 to about 100 pounds per square inch absolute to obtain an overhead fraction comprising an aqueous solution containing from about 20 to about 65 percent nitric acid and a bottom fraction comprising said liquid ketocarboxylic acid anhydrides and recovering said bottom fraction.

2. The process of claim 1, wherein said 1,1-bis(3,4-dialkylphenyl)alkane is 1,1 - bis(3,4 - dimethylphenyl)ethane.

References Cited

UNITED STATES PATENTS

| | | | |
|---|---|---|---|
| 3,075,007 | 1/1963 | McCracken et al. | 260—346.4 |
| 3,197,499 | 7/1965 | McCracken et al. | 260—517 |
| 3,287,373 | 11/1966 | McCracken et al. | 260—517 |
| 3,402,184 | 9/1968 | Berthoux et al. | 260—346.4 |
| 3,453,321 | 7/1969 | McCracken et al. | 260—346.4 |
| 3,466,301 | 9/1969 | McCracken et al. | 260—346.4 |
| 3,510,513 | 5/1970 | McCracken et al. | 260—517 |

WILBUR L. BASCOMB, JR., Primary Examiner

U.S. Cl. X.R.

203—15, 17, 47, 48, 80; 260—517